United States Patent
Parazynski et al.

(10) Patent No.: US 11,194,407 B2
(45) Date of Patent: *Dec. 7, 2021

(54) CONTROLLER WITH SITUATIONAL AWARENESS DISPLAY

(71) Applicant: Fluidity Technologies Inc., Houston, TX (US)

(72) Inventors: Scott Edward Parazynski, Houston, TX (US); Jeffrey William Bull, Naperville, IL (US); Nicholas Michael Degnan, Redondo Beach, CA (US); Radley Angelo, San Diego, CA (US); Alina Mercedes Matson, Chaska, MN (US); Michael Charles Lui, Houston, TX (US)

(73) Assignee: Fluidity Technologies Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,212

(22) Filed: Apr. 24, 2020

(65) Prior Publication Data
US 2020/0387238 A1    Dec. 10, 2020

Related U.S. Application Data

(63) Continuation of application No. PCT/US2018/057865, filed on Oct. 26, 2018, which
(Continued)

(51) Int. Cl.
*G06F 3/0346*   (2013.01)
*G05D 1/00*    (2006.01)
(Continued)

(52) U.S. Cl.
CPC ......... *G06F 3/0346* (2013.01); *G05D 1/0011* (2013.01); *G05D 1/0016* (2013.01);
(Continued)

(58) Field of Classification Search
CPC .......... A63H 27/00; A63H 30/04; G08B 5/36; G05D 1/0206; G05D 1/048; G05D 1/0022;
(Continued)

(56) References Cited

U.S. PATENT DOCUMENTS

3,028,126 A    4/1962 Holleman
3,260,826 A    7/1966 Johnson
(Continued)

FOREIGN PATENT DOCUMENTS

CN    1310366 A    8/2001
CN    102346498 A    2/2012
(Continued)

OTHER PUBLICATIONS

Office Action for U.S. Appl. No. 13/797,184, dated Mar. 2, 2015, 16 pages.
(Continued)

*Primary Examiner* — Charles V Hicks
(74) *Attorney, Agent, or Firm* — Cooley LLP

(57) ABSTRACT

A hand controller for commanding or controlling a target, such as a remote vehicle or a virtual target, includes a display mounted on a free end of a joystick for indicating graphically a direction of the remote vehicle from the hand controller and an orientation of the target relative to the hand controller's frame of reference, based on the location and orientation of the target received by the hand controller from the target and the location and orientation of the hand controller.

17 Claims, 5 Drawing Sheets

Related U.S. Application Data is a continuation of application No. 16/163,563, filed on Oct. 17, 2018, now Pat. No. 10,331,232, which is a continuation-in-part of application No. 16/114,190, filed on Aug. 27, 2018, now Pat. No. 10,198,086, which is a continuation-in-part of application No. 15/964,064, filed on Apr. 26, 2018, now Pat. No. 10,520,973, which is a continuation-in-part of application No. 15/796,744, filed on Oct. 27, 2017, now Pat. No. 10,664,002.

(51) Int. Cl.
 *G08B 5/36* (2006.01)
 *G05D 1/02* (2020.01)
 *G05D 1/04* (2006.01)

(52) U.S. Cl.
 CPC .............. *G05D 1/0022* (2013.01); *G08B 5/36* (2013.01); *G05D 1/0206* (2013.01); *G05D 1/048* (2013.01)

(58) Field of Classification Search
 CPC ... G05D 1/0011; G05D 1/0016; A63F 13/285; A63F 13/245; G06F 3/0346
 See application file for complete search history.

(56) References Cited

U.S. PATENT DOCUMENTS

| | | |
|---|---|---|
| 4,012,014 A | 3/1977 | Marshall |
| 4,216,467 A | 8/1980 | Colston |
| 4,420,808 A | 12/1983 | Diamond et al. |
| 4,584,510 A | 4/1986 | Hollow |
| 4,590,339 A | 5/1986 | Scott-Jackson et al. |
| 4,733,214 A | 3/1988 | Andresen |
| 5,042,314 A | 8/1991 | Rytter et al. |
| 5,127,608 A | 7/1992 | Farineau et al. |
| 5,128,671 A | 7/1992 | Thomas, Jr. |
| 5,223,776 A | 6/1993 | Radke et al. |
| 5,317,301 A | 5/1994 | DeVolpi |
| 5,459,382 A | 10/1995 | Jacobus et al. |
| 5,503,040 A | 4/1996 | Wright |
| 5,559,432 A | 9/1996 | Logue |
| 5,565,891 A | 10/1996 | Armstrong |
| D375,765 S | 11/1996 | Kawasaki |
| 5,607,158 A | 3/1997 | Chan |
| 5,617,515 A | 4/1997 | MacLaren et al. |
| 5,643,087 A | 7/1997 | Marcus et al. |
| 5,687,080 A | 11/1997 | Hoyt et al. |
| 5,694,153 A | 12/1997 | Aoyagi et al. |
| D389,198 S | 1/1998 | Hama |
| 5,749,577 A | 5/1998 | Couch et al. |
| 5,781,180 A | 7/1998 | Couch et al. |
| 5,831,408 A | 11/1998 | Jacobus et al. |
| 5,963,196 A | 10/1999 | Nishiumi et al. |
| H1822 H | 12/1999 | Kelley et al. |
| 6,024,576 A | 2/2000 | Bevirt et al. |
| 6,068,554 A | 5/2000 | Tyler |
| 6,198,471 B1 | 3/2001 | Cook |
| 6,201,196 B1 | 3/2001 | Wergen |
| 6,222,525 B1 | 4/2001 | Armstrong |
| 6,429,849 B1 | 8/2002 | An et al. |
| 6,459,420 B1 | 10/2002 | Harris |
| 6,512,509 B1 | 1/2003 | McVicar |
| 6,580,418 B1 | 6/2003 | Grome et al. |
| 6,597,347 B1 | 7/2003 | Yasutake |
| 6,613,997 B2 | 9/2003 | Oster et al. |
| 6,614,420 B1 | 9/2003 | Han et al. |
| 6,624,806 B2 | 9/2003 | Hsu |
| 6,644,141 B2 | 11/2003 | Olkarinen |
| 6,664,946 B1 | 12/2003 | Stipes et al. |
| 6,865,342 B2 | 3/2005 | Hirata et al. |
| 7,131,389 B1 | 11/2006 | Hawkes |
| 7,170,420 B2 | 1/2007 | Phifer |
| 7,548,697 B2 | 6/2009 | Hudson et al. |
| 7,575,491 B1 | 8/2009 | Martin |
| 7,793,890 B2 | 9/2010 | Scherer |
| 7,823,685 B2 | 11/2010 | Blind |
| 7,931,239 B2 | 4/2011 | Pedersen et al. |
| 8,089,225 B2 | 1/2012 | Goossen |
| 8,100,218 B2 | 1/2012 | Case et al. |
| 8,212,770 B2 | 7/2012 | Obourn et al. |
| 8,258,917 B2 | 9/2012 | Cai et al. |
| 8,276,476 B2 | 10/2012 | Diccion |
| 8,300,012 B2 | 10/2012 | Yamamoto |
| 8,344,914 B2 | 1/2013 | Yeh |
| 8,345,004 B1 | 1/2013 | Kass et al. |
| 8,371,187 B2 | 2/2013 | Payandeh et al. |
| 8,380,402 B2 | 2/2013 | Hebenshield |
| D678,281 S | 3/2013 | Yung |
| 8,576,168 B2 | 11/2013 | Kabasawa et al. |
| 8,716,973 B1 | 5/2014 | Lammertse |
| 8,829,894 B2 | 9/2014 | Banerjee et al. |
| 8,866,597 B2 | 10/2014 | Brendel |
| 8,881,616 B2 | 11/2014 | Dize et al. |
| 8,887,597 B2 | 11/2014 | Black |
| 9,201,514 B1 | 12/2015 | Brandt |
| 9,501,084 B1 | 11/2016 | Bannister |
| 9,504,912 B2 | 11/2016 | Ikeda et al. |
| 9,547,380 B2 | 1/2017 | Parazynski |
| 9,727,076 B2 | 8/2017 | Smith |
| 10,133,271 B2 | 11/2018 | Hutson |
| 10,152,853 B2 | 12/2018 | Provancher et al. |
| 10,198,086 B2 | 2/2019 | Parazynski et al. |
| 10,222,794 B2 | 3/2019 | Deng et al. |
| 10,324,487 B2 | 6/2019 | Parazynski et al. |
| 10,324,540 B1 | 6/2019 | Parazynski |
| 10,331,232 B2 | 6/2019 | Parazynski et al. |
| 10,331,233 B2 | 6/2019 | Parazynski et al. |
| 10,481,704 B2 | 11/2019 | Parazynski et al. |
| 10,520,973 B2 | 12/2019 | Parazynski et al. |
| 10,664,002 B2 | 5/2020 | Parazynski |
| 10,921,904 B2 | 2/2021 | Parazynski et al. |
| 2002/0128064 A1 | 9/2002 | Sobota |
| 2002/0148715 A1 | 10/2002 | Oster et al. |
| 2003/0006956 A1 | 1/2003 | Wu et al. |
| 2003/0058219 A1 | 3/2003 | Shaw |
| 2003/0214484 A1 | 11/2003 | Haywood |
| 2004/0083940 A1 | 5/2004 | Shelton et al. |
| 2005/0104742 A1 | 5/2005 | Phifer |
| 2005/0159850 A1 | 7/2005 | Melman |
| 2005/0277470 A1 | 12/2005 | Watanachote |
| 2006/0137931 A1 | 6/2006 | Berg et al. |
| 2006/0156848 A1 | 7/2006 | Gosselin et al. |
| 2006/0164383 A1 | 7/2006 | Machin et al. |
| 2006/0224280 A1 | 10/2006 | Flanigan et al. |
| 2006/0262000 A1 | 11/2006 | Strong |
| 2007/0080934 A1 | 4/2007 | Chen et al. |
| 2007/0156286 A1 | 7/2007 | Yamauchi |
| 2008/0063400 A1 | 3/2008 | Hudson et al. |
| 2008/0132334 A1 | 6/2008 | Nonaka et al. |
| 2008/0174550 A1 | 7/2008 | Laurila et al. |
| 2008/0278448 A1 | 11/2008 | Nilsagard et al. |
| 2009/0152782 A1 | 6/2009 | Larson et al. |
| 2009/0179869 A1 | 7/2009 | Slotznick |
| 2009/0213073 A1 | 8/2009 | Obermeyer et al. |
| 2009/0248220 A1 | 10/2009 | Ecton et al. |
| 2010/0097309 A1 | 4/2010 | Nishida et al. |
| 2010/0302017 A1 | 12/2010 | Guglielmo |
| 2011/0088961 A1 | 4/2011 | Case et al. |
| 2011/0148667 A1 | 6/2011 | Yeh |
| 2011/0213384 A1 | 9/2011 | Jeong |
| 2011/0219899 A1 | 9/2011 | Dize et al. |
| 2012/0071752 A1 | 3/2012 | Sewell et al. |
| 2012/0187238 A1 | 7/2012 | Lam |
| 2012/0249455 A1 | 10/2012 | Nagata et al. |
| 2013/0147611 A1 | 6/2013 | Brendel |
| 2013/0178293 A1 | 7/2013 | Nakayama et al. |
| 2013/0293362 A1 | 11/2013 | Parazynski |
| 2014/0083225 A1 | 3/2014 | Downs et al. |
| 2014/0247119 A1 | 9/2014 | Robbins et al. |
| 2014/0249695 A1 | 9/2014 | Gettings et al. |
| 2015/0253801 A1 | 9/2015 | Wuisan et al. |

(56) References Cited

U.S. PATENT DOCUMENTS

| | | | |
|---|---|---|---|
| 2016/0077589 | A1 | 3/2016 | Chataignier et al. |
| 2016/0195939 | A1 | 7/2016 | Parazynski |
| 2016/0241767 | A1 | 8/2016 | Cho et al. |
| 2017/0121000 | A1 | 5/2017 | Forslund et al. |
| 2017/0133175 | A1 | 5/2017 | Lin et al. |
| 2017/0175884 | A1 | 6/2017 | Watanabe |
| 2017/0233983 | A1 | 8/2017 | Wright |
| 2017/0246533 | A1 | 8/2017 | LaChappell et al. |
| 2017/0269587 | A1 | 9/2017 | Hong |
| 2018/0164799 | A1 | 6/2018 | Hong |
| 2018/0356907 | A1 | 12/2018 | Parazynski et al. |
| 2019/0025869 | A1 | 1/2019 | Parazynski |
| 2019/0033987 | A1 | 1/2019 | Parazynski et al. |
| 2019/0041891 | A1 | 2/2019 | Parazynski et al. |
| 2019/0041894 | A1 | 2/2019 | Parazynski et al. |
| 2019/0042003 | A1 | 2/2019 | Parazynski et al. |
| 2019/0042004 | A1 | 2/2019 | Parazynski et al. |
| 2019/0071167 | A1 | 3/2019 | Selwa et al. |
| 2019/0243468 | A1 | 8/2019 | Parazynski et al. |
| 2020/0285326 | A1 | 9/2020 | Parazynski et al. |
| 2020/0387239 | A1 | 12/2020 | Parazynski et al. |
| 2020/0393865 | A1 | 12/2020 | Parazynski et al. |
| 2021/0011561 | A1 | 1/2021 | Parazynski et al. |
| 2021/0173391 | A1 | 6/2021 | Parazynski et al. |

FOREIGN PATENT DOCUMENTS

| | | |
|---|---|---|
| CN | 102824746 A | 12/2012 |
| CN | 108885452 A | 11/2018 |
| GB | 2091423 A | 7/1982 |
| JP | H11-154031 | 6/1999 |
| WO | WO 2007/055606 | 5/2007 |
| WO | WO 2019/122926 | 6/2019 |

OTHER PUBLICATIONS

Office Action for U.S. Appl. No. 13/797,184, dated Oct. 16, 2015, 15 pages.
Office Action for U.S. Appl. No. 15/071,624, dated May 17, 2016, 20 pages.
Office Action for U.S. Appl. No. 15/394,490, dated Nov. 21, 2018, 10 pages.
Office Action for U.S. Appl. No. 16/682,509, dated Jul. 20, 2020, 11 pages.
Office Action for U.S. Appl. No. 15/796,744, dated Dec. 21, 2018, 8 pages.
Office Action for U.S. Appl. No. 15/796,744, dated Aug. 7, 2019, 21 pages.
First Office Action for Chinese Application No. 201780080619.X, dated Mar. 16, 2020, 15 pages.
International Search Report and Written Opinion for International Application No. PCT/US2017/058905, dated Feb. 23, 2018, 5 pages.
Office Action for U.S. Appl. No. 15/964,064, dated Mar. 18, 2019, 11 pages.
International Search Report and Written Opinion for International Application No. PCT/US2018/057862, dated Jan. 11, 2019, 15 pages.
Office Action for U.S. Appl. No. 16/163,561, dated Dec. 11, 2018, 13 pages.
International Search Report and Written Opinion for International Application No. PCT/US2018/057864, dated Feb. 26, 2019, 14 pages.
Office Action for U.S. Appl. No. 16/163,563, dated Dec. 12, 2018, 22 pages.
International Search Report and Written Opinion for International Application No. PCT/US2018/057865, dated Jan. 4, 2019, 10 pages.
Office Action for U.S. Appl. No. 16/163,565, dated Dec. 19, 2018, 39 pages.
International Search Report and Written Opinion for International Application No. PCT/US2018/057874, dated Jan. 10, 2019, 10 pages.
"Feel Your Drone With MotionPilot's Haptic Joystick", Engadget, https://www.engadget.com/2018/01/19/motionpilothaptic-drone-joystick/, dated Jan. 19, 2018.
"CES 2018: TIE Develop World's First One-Hand Drone Controller System," Live At PC.com, https://liveatpc.com/ces-2018-tie-develops-worlds-first-one-hand-drone-controller-system/, dated Jan. 2018.
"[Review] JJRC H37 Baby Elfie: Is it a Worthy Successor?" DronesGlobe, http://www.dronesglobe.com/review/baby-elfie/, dated Oct. 7, 2017.
"Learn How to Pilot in Less Than 2 Minutes", Wepulsit, http://www.wepulsit.com/, dated 2017.
"InnovRC Firmware v1.2", InnovRC, http://www.innovrc.de/ivrcwiki/index.php?title=Hauptseite, dated Mar. 2013.
"H.E.A.R.T.—Hall Effect Accurate Technology: A Unique 3D Technological Innovation Built Into the New Thrustmaster Joystick," Thrustmaster, http://www.thrustmaster.com/press/heart-hall-effect-accurate-technology-unique-3d-technological-innovation-built-new-thrustmaste, dated Jan. 7, 2009.
Pamplona, V. F. et al., "The image-based data glove," Proceedings of the 10th Symposium on Virtual and Augmented Reality, (SVR'2008), Joao Pessoa, Brazil, 2008, 204-211.
Wilbert, J. et al., "Semi-robotic 6 degree of freedom positioning for intracranial high precision radiotherapy; first phantom and clinical results," Radiation Oncology, 5(42), 11 pages, May 26, 2010.
Zhai, X., "Human performance in six degree of freedom input control," Doctoral Dissertation University of Toronto, Graduate Department of Industrial Engineering, 179 pages, 1995.
Office Action for U.S. Appl. No. 16/682,509, dated Mar. 16, 2021, 26 pages.
Extended European Search Report for European Application No. 17865929.8, dated Nov. 13, 2020, 9 pages.
Office Action for U.S. Appl. No. 16/858,202, dated Dec. 30, 2020, 7 pages.
Office Action for U.S. Appl. No. 16/858,217, dated Feb. 3, 2021, 7 pages.
Office Action for U.S. Appl. No. 17/110,576, dated Jan. 29, 2021, 25 pages.
International Search Report and Written Opinion for International Application No. PCT/US2020/063577, dated Apr. 14, 2021, 9 pages.
Partial Supplementary European Search Report for European Application No. 18871801.9, dated May 27, 2021, 15 pages.
Office Action for U.S. Appl. No. 17/155,946, dated Aug. 2, 2021, 7 pages.
First Office Action for Chinese Application No. 201880083427.9, dated Jun. 28, 2021, 13 pages.
Extended European Search Report for European Application No. 18870577.6, dated Jul. 23, 2021, 8 pages.
Extended European Search Report for European Application No. 18870040.5, dated Jun. 25, 2021, 9 pages.

CONTROLLER WITH SITUATIONAL AWARENESS DISPLAY

CROSS-REFERENCE TO RELATED APPLICATIONS

This application is a continuation of International Patent Application No. PCT/US2018/057865, filed on Oct. 26, 2018, which is a continuation of U.S. patent application Ser. No. 16/163,563, filed on Oct. 17, 2018, now U.S. Pat. No. 10,331,232, which is a continuation-in-part of U.S. patent application Ser. No. 16/114,190, filed on Aug. 27, 2018, now U.S. Pat. No. 10,198,086, which is a continuation-in-part of U.S. patent application Ser. No. 15/964,064, filed on Apr. 26, 2018, now U.S. Pat. No. 10,520,973, which is a continuation-in-part of U.S. patent application Ser. No. 15/796,744, filed on Oct. 27, 2017, which claims the benefit of and priority to U.S. Provisional Patent Application No. 62/413,685, filed on Oct. 27, 2016, each of which is incorporated herein by reference in its entirety.

FIELD OF THE INVENTION

The present disclosure relates to visual augmentation to enhance situational awareness on controllers with which a person commands movement of a remote target, in particular unmanned vehicles such as aerial drones, remotely operated underwater vehicles, robotic arms and industrial cranes, as well as targets within virtual and augmented reality simulations, computer aided design of 3-dimensional objects, and computer games.

BACKGROUND OF THE INVENTION

Input devices or controllers, such as, joysticks, control columns, computer mice, cyclic sticks and foot pedals generate control inputs for a real or virtual target by sensing movement of one or more control members by a person that is commanding or controlling movement and operation of a target. These types of controllers have been used to control inputs for parameters such as to control pitch, yaw, and roll of the target, as well as navigational parameters such as translation (e.g., x-, y-, and z-axis movement) in a three-dimensional (3D) space, velocity, acceleration, and/or a variety of other command parameters. Examples of physical targets whose movement can be controlled remotely include aircraft, such as drones, submersible vehicles, robotic arms, industrial cranes and spacecraft. Examples of virtual targets whose movement can be controlled remotely include virtual and augmented reality simulations, computer aided design of 3-D objects and a wide range of computer games.

When controlling and operating unmanned vehicles, such as aerial drones (for example, quadcopters) that are capable of being controlled from a distance, a person commanding or piloting the remote vehicle typically must maintain visual line of sight (VLOS) of the remote vehicle in order to navigate. However, the user may sometimes momentarily lose sight of or not be able to observe clearly or unambiguously a target's position, movement, altitude, and/or orientation. This may also occur in situations involving devices that are capable of traveling beyond the visible line of sight (BVLOS) of the user. In other situations, this may occur when the target is occluded from the view of the operator in the case of hazy atmospheric conditions or low contrast environmental conditions.

SUMMARY

The present disclosure describes representative, non-limiting examples of embodiments of controllers comprising joysticks for controlling movement of physical and virtual targets with a display for displaying situational awareness information to an operator.

In one representative embodiment, a controller comprises a joystick on which is mounted a visual display indicating a direction to the target and a direction of travel of the target within a reference frame of the controller and based on the orientation of the controller.

Additional aspects, advantages, features and embodiments are described below in conjunction with the accompanying drawings.

DESCRIPTION OF ILLUSTRATIVE EMBODIMENTS

Figure 1A:
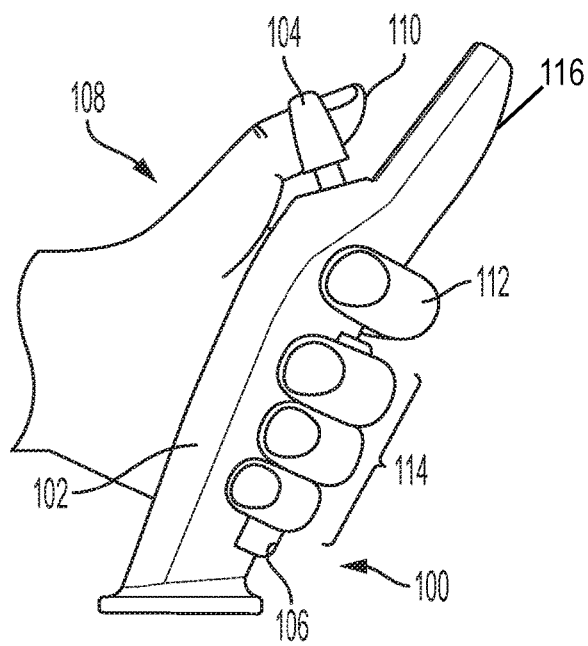
FIGS. 1A and 1B are schematic views of an example of a hand controller capable of controlling commercial drones and other remote, unmanned vehicles, as well as virtual targets in a computer or simulation environment.

For promoting an understanding of the principles of the invention that is claimed below, reference will now be made to the embodiments and examples illustrated in the appended drawings. By describing specific embodiments and examples, no limitation of the scope of the claimed subject matter, beyond the literal terms set out in the claims, is intended unless a definition for the terms is expressly given. Alterations and further modifications to the described embodiments and examples are possible while making use of the claimed subject matter, and therefore are contemplated as being within the scope of the subject matter that is claimed.

In the drawings and description that follows, the drawings are not necessarily to scale. Certain features of the invention may be shown in schematic form. Details or presence of conventional or previously described elements may not be shown in a figure in the interest of clarity and conciseness.

All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application prevail.

The present disclosure describes several embodiments of a control system that allows a user to command, using a single hand, a control target or point of reference (POR).

Each of these embodiments are representative, non-limiting examples of controllers having one or more control members that, when displaced by the user's hand or digits, generate a set of signals in each degree of freedom of movement in which it is displaced. Each of these signals are then used to generate control inputs that are transmitted to a target control system. The controller maps the sensor signals to predetermined control inputs. The mapping can be, in one embodiment, changed or programmed so that the signal from any degree of freedom being commanded with the controller can be mapped to any control input for the target.

The control member is, preferably, mounted to a base or platform held or worn by the user that acts as a frame of reference for measuring displacement of the first control member of the controller; houses signal conditioning circuits for interfacing sensors for measuring displacement, a processor for running software programmed processes, such as those described herein, a battery or other source for power, interfaces for other hardware, and transmitters and receivers for wireless communication. A non-limiting, representative example is a mobile controller system. A mobile controller that is carried in one hand, with one or more control members displaced by the other hand, provides a consistent, known reference frame (stabilized by the user's other hand) even while moving, e.g., walking, skiing, running, driving. For certain types of applications, for example inspection, security and cinematographic drone missions, a hand controller may be mounted on a platform that can be held or otherwise stabilized by the user's other hand. The platform may include secondary controls and, if desired, a display unit. In one example, all 6-DoF inputs of a controller having first control member with 3-DOF of movement and a second control member mounted to it with an additional 3-DOF of movement, can be reacted through the platform. With such an arrangement, this example of a control system facilitates movement through the air like a fighter pilot with intuitive (non-deliberate cognitive) inputs.

U.S. patent application Ser. Nos. 13/797,184 and 15/071,624 are each incorporated herein by reference in their entireties, describe several embodiments of a controller that can be configured to permit a user to use a single hand to generate control inputs with four to six degrees of freedom (6-DOF), simultaneously and independently using a control that can be manipulated using a single hand. (The controller can be made with a structure capable of being displaced in 4, 5 or 6 DOF, or it can be made with a structure capable of functioning in, for example, 6 DOF but configured or set up to generate control inputs for a target for fewer than all 6 DOF. Various aspects of the single-handed controllers described in these applications, individually and/or in combination with other of these aspects, better enable users, whether they are in motion or at rest (such as computer augmented or virtual reality gamers, pilots, hikers, skiers, security/SAR personnel, war-fighters, and others, for example) to control an asset or target in physical and/or virtual three-dimensional space, by enabling generation of control inputs while also limiting cross-coupling (unintended motions). A controller with these features can be used to allow the controller to decouple translation (movement in physical space, or X, Y and Z) from attitude adjustments (reorientation in pitch, yaw and roll) in the control requirements of computer aided design, drone flight, various types of computer games, virtual and augmented reality and other virtual and physical tasks where precise movement through space is required.

Figure 1B:
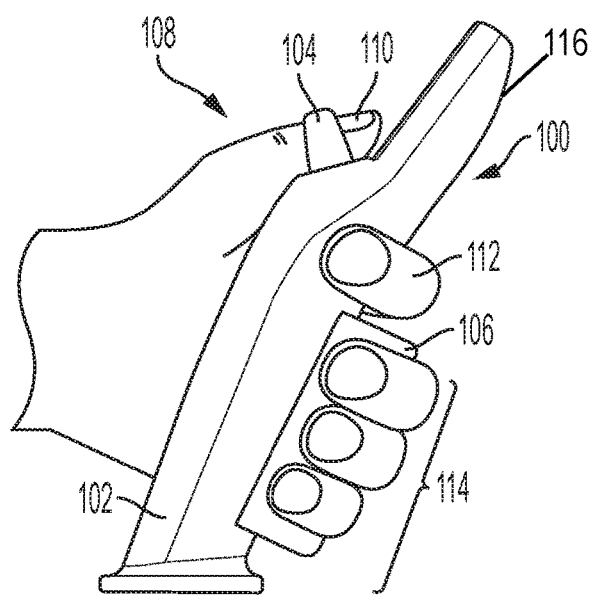

FIGS. 1A and 1B illustrate an example of a controller for a remote physical or virtual target comprising three control members: a first control member 102, an optional second control member 104, and an optional third control member 106. The first control member is in the form of a joystick to be grasped by an operator. The joystick has three degrees of freedom (DOF) of movement: rotation about each of two orthogonal axes and a rotation about a third axis orthogonal to the other two. The 3 DOF of movement can be used, for example, to generate control inputs for pitch, roll and yaw of a target. The first control member is coupled to the base so that it can be pivoted. A support for the first control member, which allows it to pivot, senses or measures angular displacement of the first control member relative to the base to generate signals that a controller will use to generate control inputs. The 3 DOF of movement of the joystick can be mapped to generate any combination of control inputs for rotational and translational axes.

A second control member 104 can be mounted on a first control member to provide at least a fourth degree of freedom to enable the controller to generate control inputs suitable for flying, for example, drone aircraft. This second control member can be manipulated by, for example, the user's thumb or index finger. Another sensor detects displacement of the second control member relative to the first control member or a linkage between the second and third control members as described below.

A user's hand 108 grips the first control member, in an area of the first control member specially formed or adapted for gripping. The user's thumb 110 is being used to displace the second control member 104 along a Z axis. In this example, a thumb loop is used to allow the user's thumb to pull up on the second control member. However, the thumb loop does not have to be used. In other embodiments, the thumb loop can be replaced with another type of control member. The third control member is mounted lower on the grip portion and large enough for any one or more of the user's third, fourth or fifth digits 114 to depress it inwardly, toward the first control member. The third control member could, alternatively, be mounted high enough to allow the user's index finger 112 to depress it. In FIG. 1A, the second control member is extended upward, and the third control member is depressed. The user can cause this displacement by depressing the third control member, pulling up on the second control member, or a combination of both. In FIG. 1B, the second control member is pressed down, toward the first control member, causing the third control member to push outwardly from the first control member. The ability to push back on the third control member by squeezing with one or more fingers allows the displacement to be more easily controlled by the user than with the thumb alone. Controller 100 includes an extension portion 116, which extends behind (relative to the user) and above the second control member 104.

Figure 2:
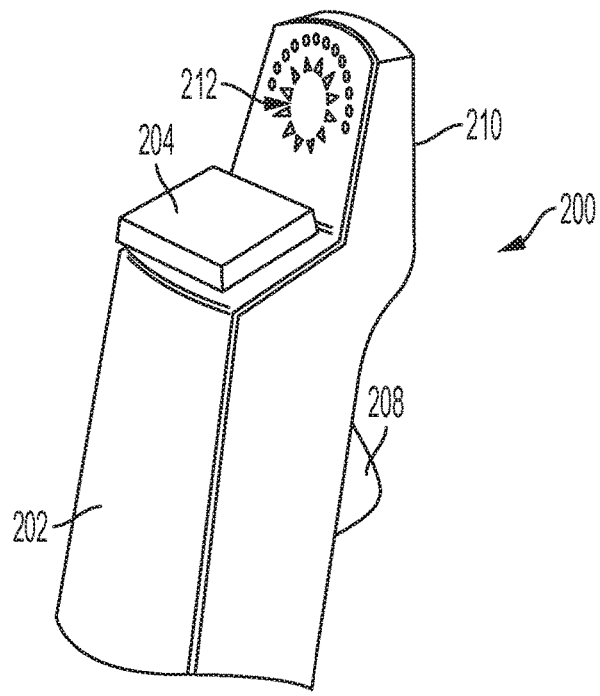
FIG. 2 is a perspective, simplified view of an example of a hand controller.

FIG. 2 is a schematic illustration of hand controller 200 like controller 100 shown in FIGS. 1A and 1B. It includes first, second and third control members 202, 204, and 208, which operate like those described above in connection with other hand controllers. Like controller 100, the first control member includes an extension 210 (integrally formed with it, in this example, though it could be a separate piece that is attached) on which there is a display 212 that indicates information transmitted from a target, such as an aerial drone. Examples of information that it could display include direction of travel, altitude, and other positional or orientation information. For other types of piloting tasks, task-specific data could be displayed, e.g., for a remotely piloted submersible, depth, current velocity, current direction and battery power might be rendered on a display.

Figure 3:
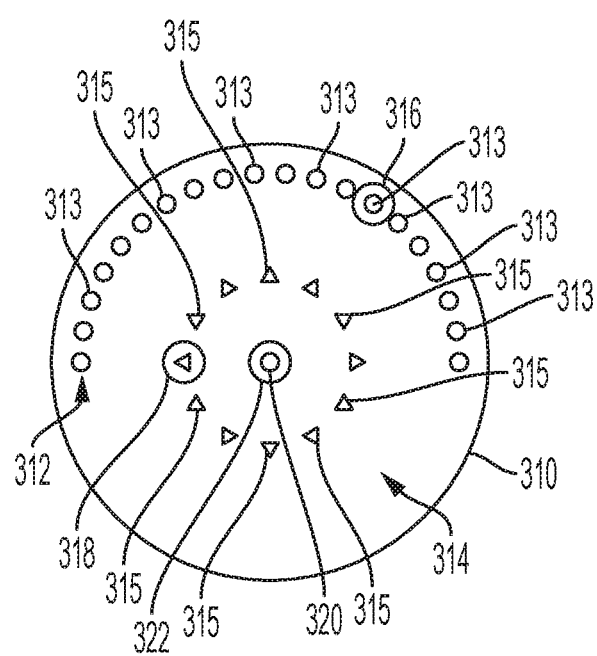
FIG. 3 is a representative view display for a controller for commanding a remote vehicle that displays target situational awareness information.
Figure 4:
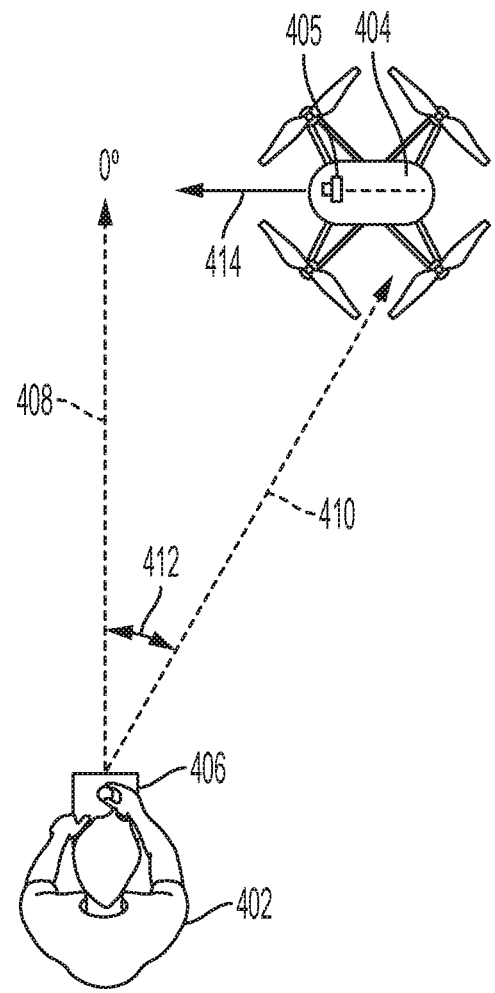
FIG. 4 is a representative situation showing the relationship of a target to controller that includes the display of FIG. 3.
Figure 5A:
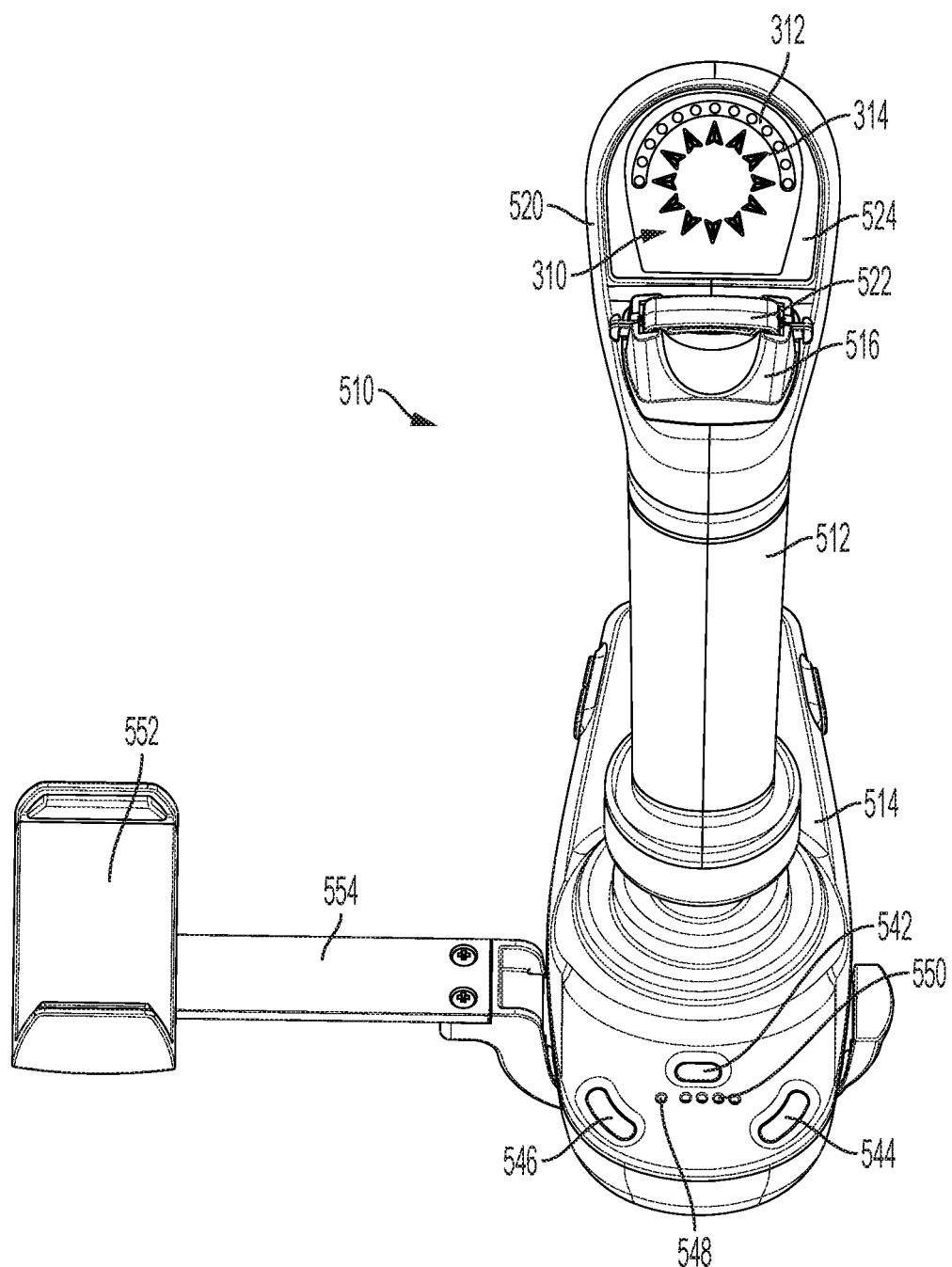
FIG. 5A is a rear perspective view of an exemplary hand controller capable of displaying target situational awareness information.
Figure 5D:
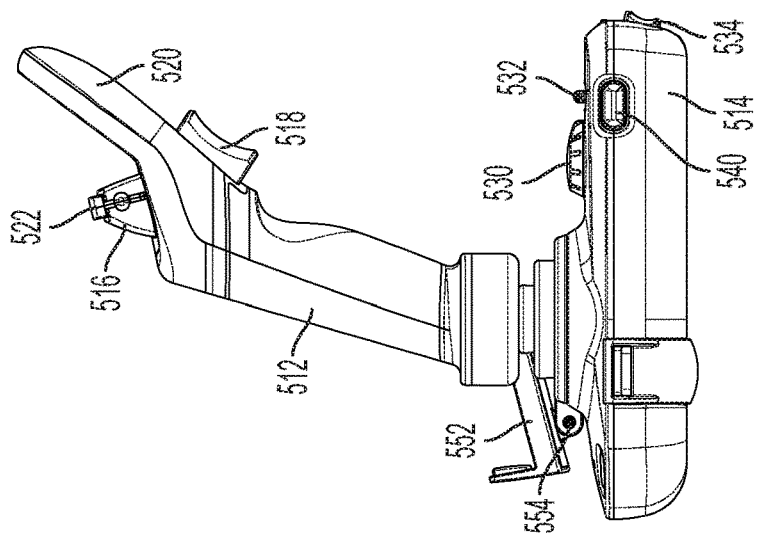
FIG. 5D is a right side view of the hand controller of FIG. 5A.
Figure 5C:
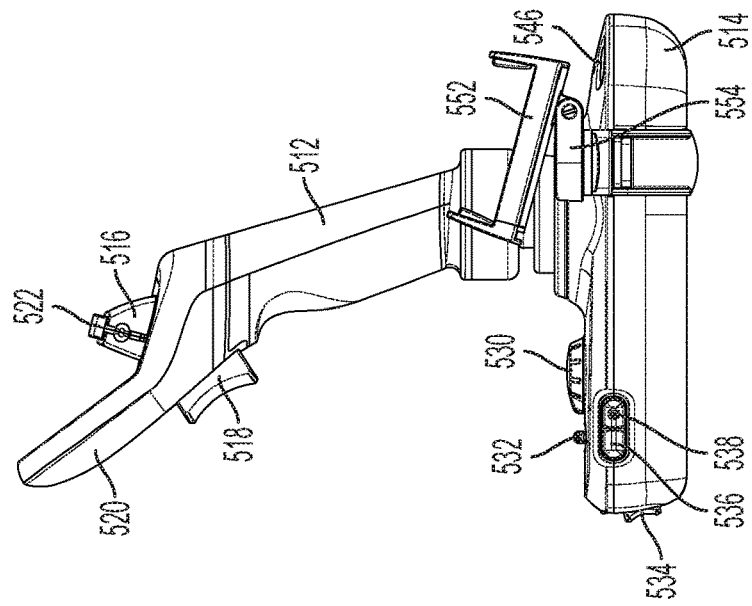
FIG. 5C is a left side view of the hand controller of FIG. 5A.
Figure 5B:
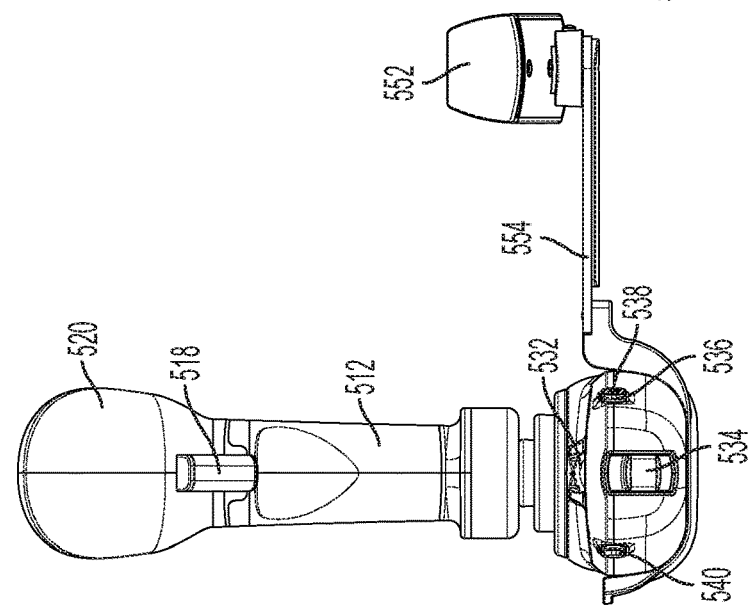
FIG. 5B is a front view of the hand controller of FIG. 5A.
Figure 5E:
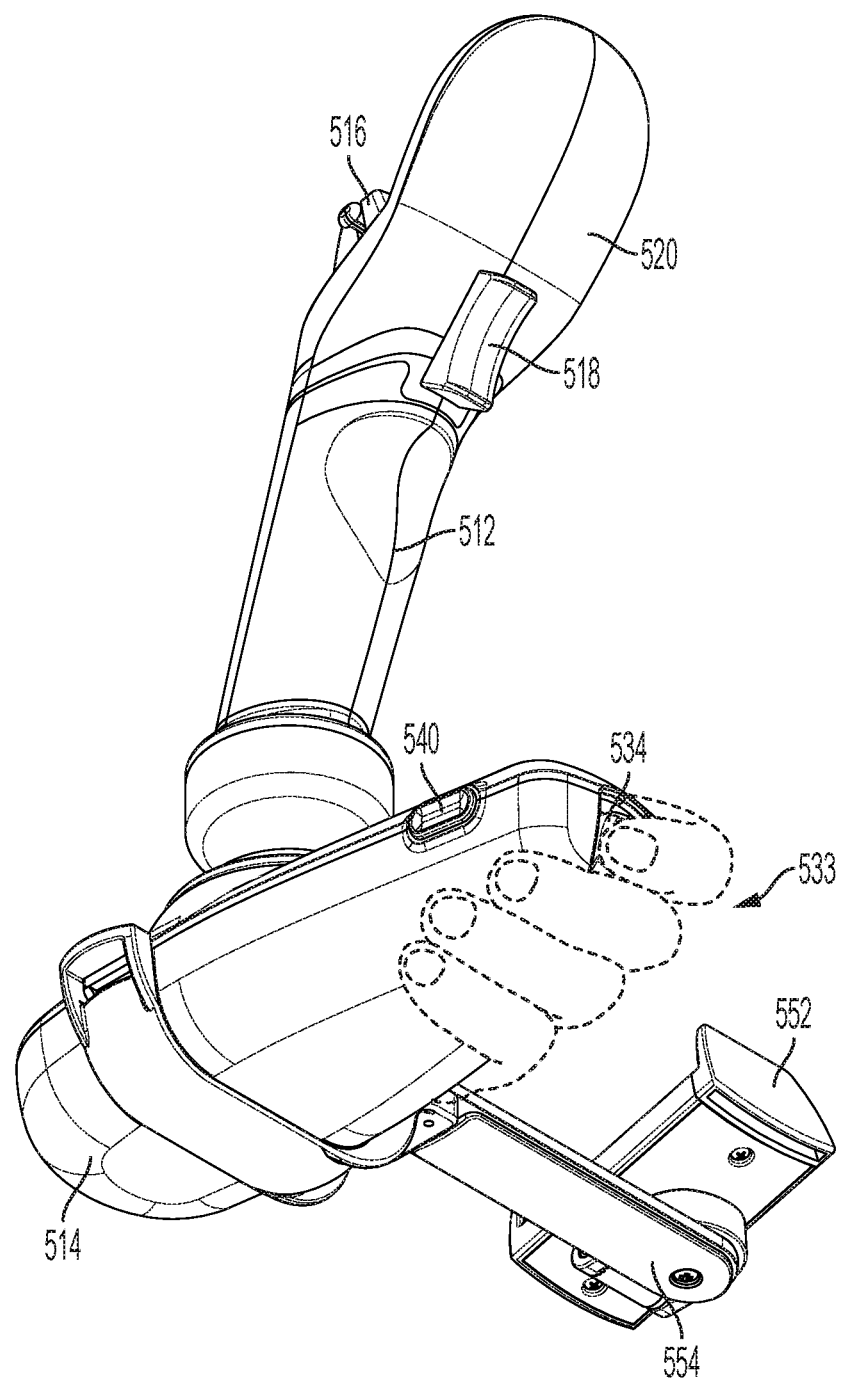
FIG. 5E is a bottom, front right perspective view of the hand controller of FIG. 5A.

Turning now to FIGS. 3 and 4, illustrated schematically in FIG. 3 is an example of a graphical display 310 of size suitable for placement on a hand controller for making immediately available critical situational awareness information to a user or person remotely piloting a moving target. Examples of such a target include those previously mentioned, both real and virtual. The illustrated embodiment of a controller with one or more situational awareness displays will be described in the context of applications involving unmanned aerial vehicles, water vessels (on the surface or a under the surface), or similar device that is commanded by a remote pilot. However, the hand controller may also be adapted for controlling virtual targets.

FIG. 4 depicts an example of a user 402 commanding an aerial drone 404, which is a quadcopter in this example, with a hand-held controller 406. The controller transmits control inputs to a controller onboard the aerial drone. The drone also wirelessly transmits signals back to the remote controller 406. Although not indicated, the controller may include, for example, two joysticks positioned to be operated by a user's thumb when the user is gripping a controller with both hands. It may also be comprised of a single-handed controller with a first control member that is gripped by a user's hand and an optional second control member mounted on the first control member, like the example described above.

The situational awareness display shown in FIG. 3 presents two or more types of situational awareness information to the user 402. In the example shown in FIG. 4 the situational awareness information includes a direction (indicated by dashed line 410) from the user 402 to the target (aerial drone 404) relative to the user's frame of reference (indicated by line 408); and the orientation of the target relative to the user's frame of reference, indicated by arrow 414. The orientation of the target to the user's frame of reference also indicates the direction of travel if it is moving. The orientation of the target is determined by the nature of the target and is predefined by the target's control system. It is usually determined by the direction in which the target's nose is pointing. In the case of a drone, a camera is typically placed and oriented in the direction of the nose or front of the aerial drone.

The user's frame of reference is established by the direction in which the controller 406 is oriented. Because a controller is typically designed or intended to have a predetermined orientation with its user, the orientation of the controller will normally correspond to the direction that the user is facing. Dashed line 408 indicates the orientation of the controller in this example, which is indicated as 0°. In an alternative embodiment, the frame of reference could be fixed relative to the actual surroundings. However, displaying the situational awareness information within the context of the user or pilot commanding the target allows the user to make a quick and intuitive assessment of the situation by looking down at the control member of the controller being grasped. The dashed line 410 indicates the direction to the target, with the angle 412 between the two indicating the relative direction of the position of the drone to the controller.

The graphical display in this example includes a direction-to-target indicator 312 that has an arc-like shape, and a target-orientation indicator 314 with a circle-like shape that indicates the target's 360-degree orientation. The indicators are concentric with each other in this example. However, in alternative embodiments the relative positions of the arc and circle could be switched with the arc inside the circle. In another alternative embodiment, they could be arranged side by side.

The direction-to-target indicator 312 visually displays the direction to the target by activating a visual element at one of a plurality of predefined positions 313 along the predefined shape of the indicator that most closely aligns with a line between the controller, and in particular the joystick on the controller, and the target. Circle 316 indicates the visual activation in the illustrated scenario.

The orientation of the target within the controller's frame of reference (the same reference being used for determining the direction to the target) is indicated by target orientation indicator 314 by activating a visual element at one of a plurality of predefined positions 315 that are arranged in circle-like pattern. The visual element is activated at the position that is closest to the orientation of the target within the controller's frame of reference. Circle 318 indicates the visual activation in the illustrated scenario. The target orientation when controlling a drone or virtual target corresponds to the yaw of the drone.

The number of positions 313 and 315 for the visual elements in the direction-to-target indicator 312 and the target orientation indicator 314 may be chosen (increased or decreased from what is shown in the figures) based on the desire level of precision. Furthermore, the relative positions of the two indicators can be switched, with the target orientation indicator 314 surrounding the direction-to-target indicator 312.

Activation of a visual element that comprise either the indicators 312 and 314 may be accomplished by illuminating or displaying the element or, if already visually perceptible, by highlighting it visually. Changing the intensity, size, color, or shape, or changing its background, for a visually perceptible element are examples of ways to highlight it.

The overall shape or pattern of the respective indicators is, in preferred embodiments, visually perceptible by the user. This can be accomplished by, for example, having an always perceptible visual element at each position 313 and 315, and activating one to indicate direction or orientation in a way that highlights or otherwise draws attention to it as mentioned above. It can also be implemented by outlining or otherwise suggesting the shapes of the respective indicators 312 and 314. For example, a printed overlay or mask could be used to do this in some implementation, depending on the implementation.

In the illustrated embodiment, direction-to-target indicator 312 is implemented using discrete visual elements at each of the positions 313. These elements are mounted on, for example, a circuit board and arranged along a curve or arc. Similarly, target orientation indicator 314 is implemented using one or more discrete visual elements at each of the positions 315, which are arranged in a circular fashion for the orientation indicator 314. These discrete visual elements can be visually perceptible when not activated or, if not visually perceptible, can be illuminated. To activate one of the discrete visual elements on an indicator, it can be highlighted by, for example, changing its intensity and/or color. The direction of the target from the hand controller is indicated by activating the visual element closest to the direction of the target from the hand controller. Similarly, the discrete visual element closest to the orientation of the target is activated for orientation of the target.

An example of a discrete visual element that can be used for either or both of the indicators 312 and 314 is a discrete lighting element. One non-limiting example of a discrete lighting element includes a light emitting diode (LED). The indicators may, depending on the implementation, also include a mask to create a pattern for each discrete visual element, such as an arrow tip or other shape, and a filter that colors the light.

In alternative embodiment, an element that moves, such as a sweeping hand, could be substituted for an array of discrete elements for either or both of the indicators.

An alternative implementation for the indicators 312 and 314 is to use LCD or other type of screen comprising an array of pixels and software running a processor that generates graphically on the screen the indicators 312 and 314. Although there are advantages to using software to generate the indicators, using discrete visual elements is less expensive and complex, and more reliable, than using a programmable display, such as a LCD, OLED, or similar type of screen that is used for graphical user interfaces in various types of electronic devices.

The direction-to-target indicator is oriented so that the center light is aligned with the 0° reference 408 and extends, in one representative example, between −90° and 90° degrees in either direction from center. A pilot or user operating a target within sight distance (VLOS) should know in general terms where the target should be and therefore being able to display a full 360 degrees to the target is typically not necessary. In alternative embodiments the direction-to-target indicator could, however, extend further or even be a circle. However, using an arc shape for the direction-to-target indicator saves space, thus allowing the arc and the inner circle to be larger for a given display size.

In the illustrated example, differently shaped visual elements are used for each of the indicators. The direction to target indicator 312 uses a dot-like shape and the target orientation indicator 314 uses a triangle or paper plane-like shape. The differently shaped visual elements allow a user to quickly and intuitively distinguish between them. Other shapes for the visual elements can be substituted.

Additional information can also be included on the graphical display about the situation, including one or more of: speed, altitude, depth (in the case of a submersible or submarine), battery levels, quality of the wireless connection, mode of operation, and status of various systems. If the controller is used to control a robotic arm, such a surgical robot, the graphical display may include an indicator of, for example, resistance—pressure or force, for example—being sensed by the robotic arm. In this example, the display includes a visual indicator 320 at its center. In this example it comprised of a light that is activated. The activated state is represented by circle 322. When activated, the visual indicator 320 warns a user or pilot that he or she is in control and the pressure or capacitive "deadman" sensor is active. If the user releases the joystick or other control member by which the user is commanding the target, the target may be programmed, for example, to enter and perform a predetermined routine, such as hovering, or entering an autonomous return to home mode. A deadman switch that senses whether or not a person is gripping the hand controller ensures that no one accidentally bumps into a hand controller and cause generation of a control input. The controller is active only when the user engages the deadman switch by gripping the control member. The deadman switch thus ensure a level of control and safety for control of assets in complex and high-risk environments.

FIG. 3 depicts exemplary operation of the direction-to-target indicator 312 and target orientation indicator 314. In the example of FIG. 4, the drone is directionally in front of and to the right of the user. In the depiction in FIG. 4, angle 412 is about 30 degrees. Direction-to-target indicator 312 thus activates, as indicated by circle 316, one of the visual elements 313 comprising a direction-to-target indicator 313 that is closest to 30 degrees. The orientation of the drone 404 is indicated by arrow 414. In the illustrated situation, the drone is oriented at a heading of 270 degrees within the controller's frame of reference. Target orientation indicator 314 indicates the orientation by activating the discrete visual element 315 that is at or closest to 270 degrees on the inner circle or dial, as indicated by circle 318.

Furthermore, the presentation of the visual element of the direction-to-target indicator 312 and target orientation indicator 314 need not be an arc-like or circular shape. Furthermore, the terms "arc" and "circle" are not, unless expressly stated, intended to be limited to curves that are, strictly speaking, geometrical circles or segments of circles. Rather, unless otherwise stated, those terms are intended to designate any shape that is visually capable of indicating angular direction and angular orientation within a two-dimensional frame of reference centered on the controller. For example, the shape of a traditional watch face or dial may be a square, oval, or polygonal, but the numbers are generally arranged in a circular fashion around the dial.

The same situational awareness information could be, in different embodiments, presented in different ways on a graphical display. One example includes a separate arrow or dial for each indicator, non-graphical presentations such as numerical and textual information, and a combination of graphics, numbers, and text. However, it may not have the advantages mentioned above of a quickly and intuitively discernable spatial relationship between the controller and the target. For example, when a yaw input to, for example, an aerial drone, is generated by twisting a control member on which the graphical display is mounted, the target orientation indicator 314 corresponds spatially to the motion of the control member.

Display 310 is most advantageously located on a control member, in particular on the end of a joystick or similar type of control member that will be in front of a user while being gripped or 30 otherwise manipulated by the user. However, it may also be located on a base of a controller, on which the control member is mounted, as well as on a display mounted to the base or a heads-up display.

Situational awareness displayed on the display 310 may come from any number of inputs, however typically the situational awareness is determined and transmitted to the hand controller by the target device or is determined by the hand controller in conjunction with smartphone-based accelerometers and related applications.

The following is one example of a process by which the direction to the target and orientation of the target can be determined by a hand controller. This process is implemented, for example, by an application running on a "smartphone" or other device with a processor that can run computer applications and that communicates with the controller using a wired (USB) or wireless (e.g. Bluetooth®) connection.

The remotely controlled vehicle determines its own position and heading and then transmits it to the hand controller. The hand controller receives this information. The position of the remote vehicle is determined by an onboard control system from a GPS or other geolocating service. If GPS is used, a GPS unit on board can calculate latitude, longitude, and altitude of the vehicle, and the time from GPS signals. The flight computer onboard remote vehicle also determines its orientation from an inertial measurement unit (IMU) or accelerometer.

The position of the hand controller (latitude, longitude, altitude, and time) is obtained from the smartphone being used with the controller using GPS and/or cell tower triangulation. The orientation of the hand controller may be learned from the smartphone that is attached to it in a known orientation with respect to the hand controller. The smartphone determines orientation from an IMU, accelerometer, and magnetometer, typically. However, it can be determined in other ways. The application running on the smart phone or by a processor in the hand controller performs calculations of relative angles (position and yaw) based on the orientation of the smartphone and thus the hand controller to which is it mounted.

The process being executed by the application then determines whether or not intentional commands are being sent to the target by detecting whether or not a user's hand is correctly positioned on the control member or joystick based on the state of a capacitive deadman switch on the control member or joystick.

The process continually calculates the relative direction to the target and the relative target orientation of the target for display to the user or operator based on the inputs position and orientation data received from the target and provided by the smartphone. Data indicating these values are transferred via a wireless (e.g. Bluetooth®) or wired connection to a flight controller that is part of the hand controller. Firmware that is running on the flight controller interprets the data and activates the indicators 312 and 314 on the display 310 on the control member to indicate the calculated angles.

Rather than using a smartphone, the hand controller could, in other embodiments, communicate with another type of processor-based device, or computing device, that stores and runs software for performing the process, such as a tablet, laptop computer, or wearable computing device. Alternatively, the hand controller incorporates hardware for running the software and determining geographical coordinates and orientation.

FIGS. 5A-5E depict another non-limiting example of a hand controller 510 that is configured for commanding an aerial drone, such as a quadcopter, though it can also be adapted for controlling other types of targets that move in multiple degrees of freedom, up to six degrees of freedom. Hand controller 510 has a first control member 512 with three independent degrees of movement that is configured and shaped to be gripped by an operator or pilot's hand. A proximate end of control member 512 is pivotally connected to base 514, so that the control member 512 may be independently pivoted along an x-axis and independently pivoted along a y-axis. The base is sized and shaped to be held by the operator's hand that is not gripping the control member, indicated by hand 533. Pivoting control member 512 along the x-axis tilts or moves the distal end of control member 512 side to side, relative to base 514. Pivoting control member 512 along the y-axis pivots the distal end of control member 512 forward and backward relative to base 514. Control member 512 could be made to pivot along only the x-axis or y-axis or may simultaneously pivot around both the x and y axes. The pivotal connection between control member 512 and base 514 may be made by a number of pivoting type connections, such as a gimble or a ball and socket. The controller is also moveable in a third degree of freedom by twisting it around a z-axis that is orthogonal to the x and y axes. The first control member thus displaces in three degrees of freedom, each of which can be used to generate three, independent control inputs for commanding three degrees of freedom of movement of the target.

A fourth degree of freedom of movement is provided by control member 516 located on a distal end of control member 512. Control member 516 in this example is a thumb displaceable along the z-axis by an operator's thumb that is placed on control member 516 and retained by thumb catch 522. Thumb catch 522 is adjustable to accommodate the size of a particular user's thumb so that movement of the user's thumb will be translated into movement of control member 516. Control member 518 is a trigger style control member that may be operated by a user's index finger on the same hand that is gripping the first control member. The control member 516 and control member 518 are linked to move in opposition to one another generate a fourth control input. An operator uses the operator's thumb and control member 516 to move control member 516 downward by pressing down with the user's thumb. A user may move control member upward by raising the user's thumb which is retained by thumb catch 522, which is connected to control member 516. An operator may also move control member 516 upward by squeezing control member 518. The cooperation between control member 516 and control member 518 may be accomplished in any number of ways, including using a direct, mechanical linkage or by actuators. In alternative embodiments, control member 518 can be omitted or not linked to control member 518, in which case it can be used for other purposes.

Hand controller 510 depicted in FIGS. 5A-5E also comprises display 524 on an extension 520 at the top of the controller. The extension allows the display to be better oriented toward the operator, so the operator may operate the hand controller and observe display 524 at the same time. It also allows for accommodation of second control member 516. Display 524 is used to provide situational awareness information to the operator regarding the device being controlled by the hand controller. In this example, display 524 operates as described above with respect to FIGS. 3 and 4.

The example hand controller of FIGS. 5A-5E is also comprised of display mount 552 and arm 554 for a smartphone. When used to operate a drone, a display is typically used to display a view of the drone's camera to the operator. The smartphone is mounted into display mount 552 and connected by wire or wirelessly to the hand controller so that camera video being transmitted to the hand controller from the drone can be displayed on the cellular phone. In other embodiments, other display devices such as a tablet, computer, monitor, smart glasses, first person view (FPV) goggles, or standalone display could be used. An application running on the smartphone or other computing device can be used to program the controller and set parameters.

The example of hand controller 510 depicted in FIGS. 5A-5E is further comprised of base 514 onto which are mounted or located a number of other controls. In this example, which is intended for use as a hand controller for a drone, these other controls are relevant to the control and operation of an aerial drone. The base of the controller 514 includes several buttons, dials and switches for various settings, functions and controls, including for camera settings 532, camera tilt 534, shutter release 536, and video record 538. Flight sensitivity knob 530 sets the level of the sensitivity level of the movements of the hand controller movements by the user in order to increase or decrease the responsiveness of the drone to the movements. Programmable button 540 may be programed by the operator to perform a function desired by the operator. A controller on/off switch or button 542 is used to turn to the power to the hand controller on or off. Arm drone button 544 enables the drone for takeoff. Return to home (RTH) button 546 can be used to transmit a command to the drone that causes the drone to return to a predesignated place autonomously. Power indicator light 548 illuminates when the hand controller is on, and battery indicator 550 indicates the level of charge of the hand controller batteries.

The bases for the controllers, in addition to acting as a frame of reference for measuring displacement of the first control member of the controller, houses signal conditioning circuits for interfacing sensors for measuring displacement, a processor for running software programmed processes, such as those described herein, a battery or other source for power, interfaces for other hardware, and transmitters and receivers for wireless communication.

A mobile, two-handed controller system like the one described in FIGS. 5A-5E provide a consistent, known reference frame (stabilized by the user's other hand) even while moving, e.g., walking, skiing, running, driving. For certain types of applications, for example inspection, security and cinematographic drone missions, a hand controller may be mounted on a platform that can be held or otherwise stabilized by the user's other hand. The platform may include secondary controls and, if desired, a display unit. In one example, all 6-DoF inputs of a controller, having first control member with 3-DOF of movement and a second control member mounted to it with an additional 3-DOF of movement, can be reacted through the platform. With such an arrangement, this example of a control system facilitates movement through the air like a fighter pilot with intuitive (non-deliberate cognitive) inputs.

A controller with any one or more of these features, and their variations, can be used in applications such as flight simulation, drone flight, fixed wing and rotary wing flight, computer gaming, virtual and augmented reality navigation, aerial refueling, surgical robotics, terrestrial and marine robotic control, and many others.

The base may, optionally, incorporate additional user interface elements such as keys, buttons, dials, touchpads, trackpads, track balls, and displays or a bracket for holding a smartphone, tablet or other device that acts as a display. The videos or graphical images from the application being controlled can be displayed in real time on the display, such as live video from a drone, or a game can be displayed. Alternate or optional features include one or a combination of any two or more of the following features. A base can be reconfigurable for either hand with a quick disconnect for the joystick and two mounting points. It can be either asymmetric or symmetric in shape, with ample room for secondary controls. In one embodiment a grip or handle can be located more midline to the controller, thus reducing some off-axis moments. In other embodiments, rather than holding the base it may be stabilized by mounting the base to the user's body. Example of mounting points for a base on a user's body include a chest mount, a belt, and an article of clothing.

Examples of sensors that can be used to detect and, optionally, measure displacement of control members include inertial measurement units, potentiometers, optical encoders, Hall effect sensors, and the like. Signals from the sensors are received by a processor, which generates control inputs that are transmitted by radio frequency, optical or wired (electrical or optical) signals. Mechanisms that allow for pivoting of control members to indicate displacement, such as gimbals, may optionally include torsion springs for centering the control member and sensors, such as potentiometers and Hall effect sensors, for measuring angular displacement. Couplings or linkages that connect the joystick to a gimbal, for example, could, in some embodiments, be made adjustable or adaptable to accommodate joysticks of different sizes for different sized users.

Unless otherwise indicated, each control system could be adapted in alternative embodiments to allow for different degrees of freedom of displacement for each of its first and second control members. A third control member, if used, could be used to dynamically balance displacement of the second control member along the Z axis, which would be generally aligned with a central axis of the first control member. However, in alternate embodiments, displacement of the third control member could be used as another control input and not be linked to the second control member. Many control scenarios may benefit from being able to provide rotational and translational movement using a single hand, even if fewer than all control outputs for all six degrees of freedom are required.

Variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more elements of the exemplary embodiments may be omitted, combined with, or substituted for, in whole or in part, with one or more elements of one or more of the other exemplary embodiments. Accordingly, the scope of protection is not limited to the embodiments described, but is only limited by the claims that follow, the scope of which shall include all equivalents of the subject matter of the claims.

The invention claimed is:

1. A non-transitory processor-readable medium storing code representing instructions to be executed by a processor, the instructions comprising code to cause the processor to:
   receive a control input to command movement of a target from a control member of a hand controller, the control member being mounted on and displaceable with respect to a base of the hand controller by a user for generating the control inputs;
   generate situational awareness information about the target;
   send to a display associated with the control member the situational awareness information about the target such that the display displays a representation of the situational awareness information about the target to the user.

2. The non-transitory processor-readable medium of claim 1, wherein the situational awareness information includes at least one of a direction-to-the-target relative to the hand controller, which indicates the direction from the hand controller to the target, and an orientation-of-the target relative to the hand controller.

3. The non-transitory processor-readable medium of claim 2, wherein the display includes the direction-to-target indicator and the orientation-of-target indicator.

4. The non-transitory processor-readable medium of claim 3, wherein the orientation-of-the-target indicator has a circular shape and the direction-to-target indicator has an arc-like shape.

5. The non-transitory processor-readable medium of claim 4, wherein the circular shape and the arc-like shape are concentric.

6. The non-transitory processor-readable medium of claim 2, wherein the orientation-of-the-target indicator includes a plurality of discrete visual elements configured to be changed to indicate orientation of the target relative to the hand controller.

7. The non-transitory processor-readable medium of claim 2, wherein the direction-to-target indicator includes a plurality of discrete visual elements configured to be changed to indicate direction of the target relative to the hand controller.

8. The non-transitory processor-readable medium of claim 1, the code further comprising code to cause the processor to:
receive geolocation and orientation information of the target,
the code to cause the processor to generate the situation awareness information about the target includes code to cause the processor to generate the situation awareness information about the target based on the geolocation and orientation information of the target.

9. The non-transitory processor-readable medium of claim 8, wherein the geolocation and orientation information of the target is received from a compute device operably coupled to the hand controller and in operable communication with the target.

10. The non-transitory processor-readable medium of claim 9, wherein the compute device is a smartphone.

11. The non-transitory processor-readable medium of claim 9, wherein the base includes a mount configured to be coupled to a compute device.

12. The non-transitory processor-readable medium of claim 1, wherein the situational awareness information includes at least one of depth, current direction, or current velocity of the target.

13. The non-transitory processor-readable medium of claim 1, wherein the situational awareness information includes at least one of power status of the target, temperature associated with the target, pressure associated with the target, wind direction associated with the target, or wind velocity associated with the target.

14. A non-transitory processor-readable medium storing code representing instructions to be executed by a processor, the instructions comprising code to cause the processor to:
receive information on a target's geographical position;
receive information representative of a geographical position and orientation of a hand controller that is configured to generate control inputs to control the target;
determine a direction to the target from the hand controller based on (1) the information on the target's geographical position, and (2) the information representative of the geographical position and orientation of the hand controller;
send to a display associated with the hand controller a signal to activate a visual element on the display indicating to a user of the hand controller the direction to the target from the hand controller.

15. The non-transitory processor-readable medium of claim 14, wherein the information on the target's geographical position is received from a compute device operably coupled to the hand controller.

16. The non-transitory processor-readable medium of claim 15, wherein the information representative of the geographical position and orientation of the hand controller is received from the compute device.

17. The non-transitory processor-readable medium of claim 14, wherein the compute device is a smartphone attached to the hand controller in a known orientation with respect to the hand controller.

* * * * *